Aug. 30, 1932.  V. JULLIEN  1,875,012
CLAMP ADJUSTER
Filed Nov. 12, 1930  2 Sheets-Sheet 1
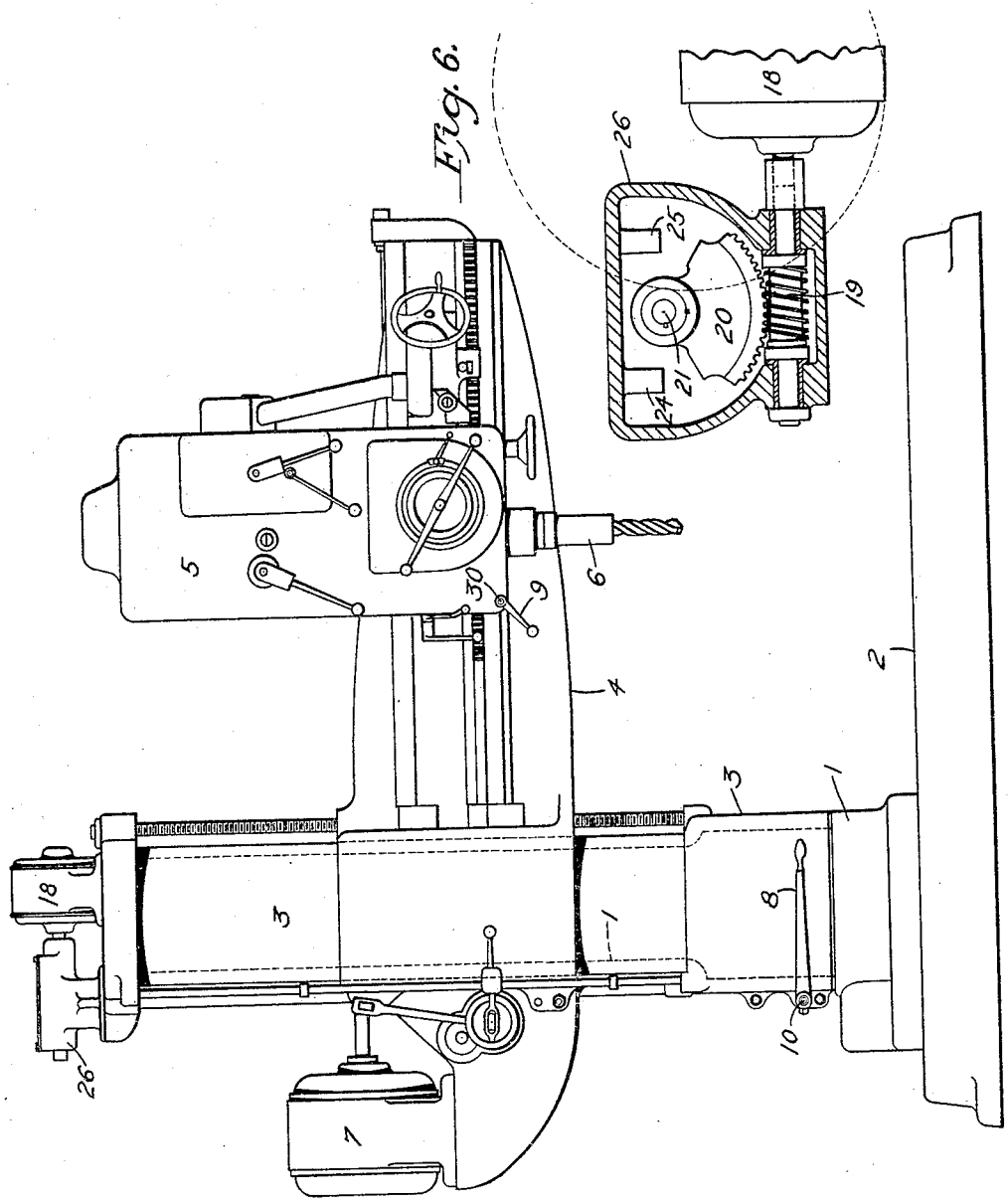

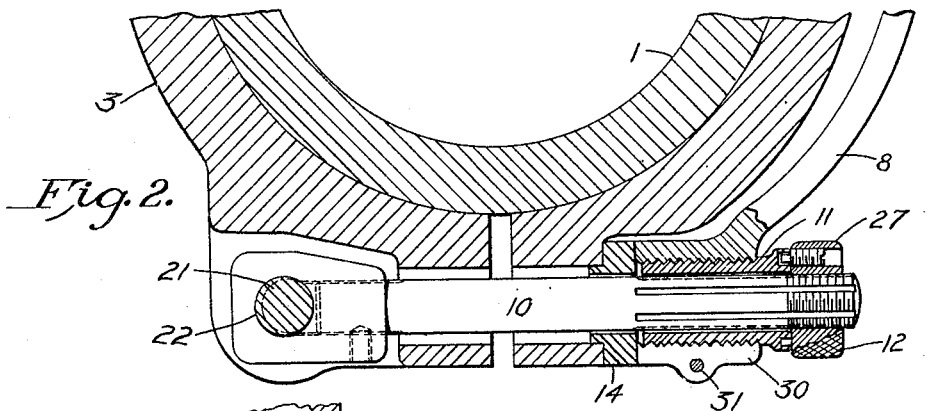
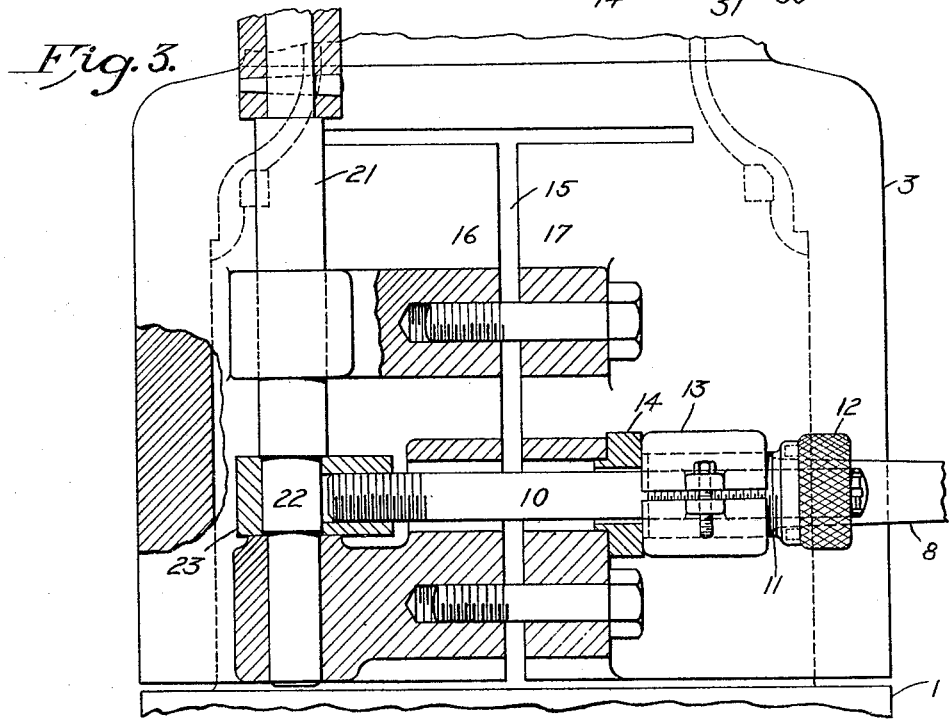
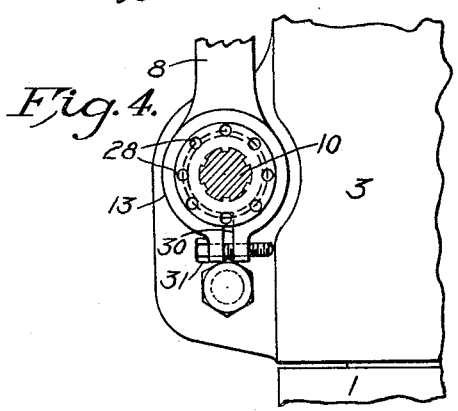
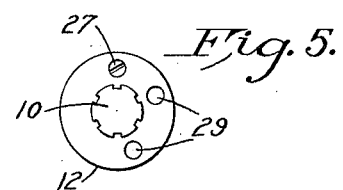

Patented Aug. 30, 1932

1,875,012

UNITED STATES PATENT OFFICE

VICTOR JULLIEN, OF CINCINNATI, OHIO, ASSIGNOR TO THE CINCINNATI BICKFORD TOOL COMPANY, OF CINCINNATI, OHIO, A CORPORATION OF OHIO

CLAMP ADJUSTER

Application filed November 12, 1930. Serial No. 495,084.

This invention concerns clamping mechanisms and relates particularly to an improved means for accurately compensating for the wear on the parts and for accurately determining and maintaining a preselected range of angular movement of the clamp actuating medium, and constitutes an improvement over the construction shown in the Patent #1,660,386 of D. C. Klausmeyer.

It has for its main object to provide a means for compensating for the wear on the clamping surfaces or on the threads of a draw bolt and clamp nut or similar clamping devices, without changing the relative angle of the clamping lever when the latter is in a fully tightened position. Unless special adjusting means are provided the ordinary effect of the wear on the clamping mechanism is to increase the angle through which the clamp lever moves before the parts are securely clamped, and if the mechanism be applied to a machine tool, such as, for example, a radial drill, the position of the clamping lever, through wear, will gradually change until a position is reached where the operator has a poor purchase for effecting a clamping operation and which may seriously interfere with the proper operation and functioning of the machine elements.

This invention proposes to overcome this undesirable situation by providing a means, readily accessible to the operator, for correcting and limiting the angular movement of the clamp lever whenever there is a tendency of the latter to exceed a predetermined position in effecting a clamping or unclamping of the parts, thereby to position the lever within easy and convenient reach of the operator to facilitate the clamping of the members and at the same time to insure that the clamping action is complete before the lever reaches a hazardous position.

A further object of this invention is to provide a single means for regulating the clearance between cooperating clamping elements, such as, for example, threaded members, and for limiting the reverse movement of a clamp lever to a predetermined position, thereby to control the degree of looseness between the threads of the clamp nut and screw and to prevent the clamp lever from being unnecessarily turned or dropping of its own weight to a dangerous position when the parts are free or unclamped.

Still another object of this invention is to provide a clamping mechanism with means for adjustably controlling the range of movement of the actuating means, whether power or manual, so that clamping of the parts may be effected within a preselected range of movement thereof.

In the attainment of these results I propose to provide the clamp stud or draw bolt, as the case may be, with an externally threaded sleeve member splined or keyed thereto and held against relative axial movement by means of an adjustable lock nut. Upon the movement of a clamp nut mounted upon the sleeve and engaging the part to be clamped, or by axially moving the draw bolt, as by power, the parts are securely clamped or unclamped according to the direction of movement of the actuating member. The angle of the clamp nut and degree of tightness of the clamp per given movement of the actuator being determined by the lock nut which shifts the sleeve and its coacting member axially along the bolt toward or away from the clamping surfaces thereby to vary the gap or clearance therebetween.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a representation of a machine tool incorporating this invention. Fig. 2 is an enlarged horizontal sectional view of a portion thereof illustrating more clearly the arrangement of the parts for either power or manual operation. Fig. 3 is a view, partly in section, projected from Fig. 2. Fig. 4 is a front view of the clamping mechanism with the lock nut removed. Fig. 5 is a detail view of the lock nut. Fig. 6 is a detail of one form of power clamping mechanism.

Although the annexed drawings illustrate this invention as associated with a drilling machine, it is to be understood that the clamp adjusting device may be readily adapted to numerous other applications or machine tools wherein it is desirable to clamp two or more members together and to provide a means for compensating for the wear on the clamping mechanism.

Fig. 1 illustrates a conventional drilling machine of the radial type, having a vertically disposed support or post 1 rising from a base member 2. A sleeve member 3, upon which is translatably mounted a drill arm 4, is revolvably mounted upon the column 1 and adapted to be locked or secured thereto in adjusted positions in a manner later to be explained. The drill arm 4 carries a translatable tool head 5 in which are mounted conventional feed and speed change gears for the tool spindle 6. The spindle driving power is taken, for example, from the motor 7 carried by the arm and enters the head at the rear thereof in a well known manner.

Under normal working conditions the drill head and sleeve member are each adapted to be locked or rigidly clamped to their supports in order to maintain accuracy in the tooling operation, and clamping mechanisms, including levers 8 and 9 for the sleeve and head respectively, are provided for this purpose. However, the continual clamping and unclamping of the members during usage, as by re-adjusting the head 5 toward or away from the column and/or re-adjusting the head, arm, and sleeve about the column, gradually causes the clamping mechanisms to become worn, and in the heretofore used constructions, to the extent that the levers must be turned beyond a predetermined point in order to effect a clamping of the members, and in some cases, the members may not be clamped even though the clamping mechanism is moved to an extreme position.

In order to compensate for the wear on the parts and to thereby correct the angle of the lever when in a clamped position, I have provided the draw bolt or stud 10 with an axially adjustable threaded sleeve member 11 upon which the clamp lever is mounted, a lock nut 12 holds the sleeve in its axially adjusted position. Interposed between the hub portion 13 of the lever and the members to be clamped, a wear plate or bushing 14 may be provided if desired.

In order to securely lock the sleeve 3 to the post 1, the lower portion of the sleeve is longitudinally and transversely slotted, as at 15, and the two wing portions 16 and 17 when cramped toward each other as by means of the draw bolt 10, lock the sleeve rigidly to the post.

So that power means may be employed for locking the column an electric motor 18 is mounted on the top thereof, which through a worm and worm-gear segment 19 and 20 oscillates a cam shaft 21. The lower end of the shaft is provided with an eccentric portion 22 which engages an eye-piece 23 of the draw bolt 10, thus, rotation of the cam shaft 21 moves the draw bolt axially to clamp or unclamp the column sleeve. Stop lugs 24 and 25 located in the worm and worm-gear housing 26 limit the extremes of movement of the cam shaft to insure that a continued or prolonged depressing of the motor control switch does not move the cam 22 past the high and low spots and thus prematurely unclamp or clamp the sleeve. The motor 18 being of special construction and winding to permit a stalling thereof for several minutes without burning out.

After a period of usage it will be noted that the power clamping device does not fully clamp the sleeve and consequently there is a loss in rigidity of the arm and in increase in tooling errors. Compensation for the wear on the parts thus occasioned is made by removing the teat of the set screw 27 from one of the holes 28 formed in the threaded sleeve member 11, and then adjusting the nut angularly one or more divisions. This movement urges the sleeve member inwardly a given distance to take up the wear and lost motion between the parts. The teat of the screw is again inserted in the nearest hole 28 which coincides with the position of the screw 27.

It will be noted that the pin 27 and holes 28, not only provide a means for guarding against the working loose or accidental movement of the nut 12, but provide a means for attaining accurate adjustment of the clamp or the positioning of the lever, thus for example, advancing the nut known increments of movement, advances the sleeve member predetermined fractions of the lead of the thread on the lock nut and thereby imparting a corresponding movement to the clamp nut 12 which effects a change in the angle of the clamp lever when in clamped position.

For greater accuracy in clamp adjustment the splined sleeve 11 may be removed from the shaft 10, turned one or more positions and replaced, and in this way the number of axial positions of the sleeve per revolution of the nut 12 is multiplied by the number of possible different angular positions of the sleeve.

As an additional refinement, and in order to obtain extreme accuracy in clamp adjustment, the nut 12 may be bored and tapped in a number of places, preferably of unequal spacing, so that the screw 27 may be inserted in any coinciding holes without further adjustment of the nut and sleeve. And if the spacing of the holes 29 in the nut be calibrated with respect to the total number of divisions in, and angular positions of, the sleeve number 11, so as to again divide each angular position of the nut into a number of finer divisions, it will be seen that extremely close and accurate adjustments of the clamping mechanism may be obtained. Fine adjustments of this nature are highly desirable in order to maintain preselected positions of the clamp lever or power controlled clamping mechanisms when the members are clamped without unduly stressing the parts or exceeding the capacity of the materials.

It may be mentioned here that the construction and mode of operation of the head clamping mechanism, of which lever 9 forms a part, is in every way similar to the column clamping mechanism above described and detailed description and illustration thereof has been thought unnecessary. Suffice it to say, however, that the draw bolt 30 slidably but non-rotatably engages a rear face of one of the arm-ways and upon the turning of the lever 9, that corner of the head 5 which has a tendency to pull away from the arm during a tooling operation is drawn tightly and securely against its support.

An additional means for taking up the wear on the threads of the sleeve 11, illustrated more clearly in Fig. 4, consists in slotting the hub portion 13 of the lever 8 as at 30, and pinching the parts together as the threads become worn by means of a screw 31. In this way a proper fit between the threaded portions may be maintained at all times as well as providing a means for adjusting the frictional resistance between the threads so that the lever will remain in any position without danger of dropping and effecting of its own weight, a partial clamping of the members.

The tension varying screw 31 also provides a stop means for limiting the movement of the lever at one of its extremes of movement so that the operator may obtain a good purchase thereon at all times and so that the power clamping mechanism will not be rendered inoperative when the parts are unclamped manually and conversely.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A clamping mechanism for a radial drilling machine combining a support; a member mounted thereon and adapted to be clamped thereto; clamping means therefor including a draw bolt, a cam member operatively engaging said draw bolt, a sleeve member adjustable axially on said bolt, and a clamp nut threaded on said sleeve and cooperatively engaging the member to be clamped; power means for rotating said cam member through a limited arc to effect clamping action; means for shifting the sleeve on said bolt to vary the effectiveness of said power actuating means; and means for adjusting said clamp nut angularly to effect clamping action independently of said power means.

2. The combination set forth in claim 1 characterized by means for varying the effectiveness of the clamping action for a limited angular movement of said clamp nut.

3. A clamping mechanism for a radial drill combining a support; a member mounted thereon and adapted to be clamped thereto; clamping means therefor including a draw bolt, a cam member operatively engaging said draw bolt, a sleeve member adjustable axially on said bolt, a clamp nut threaded on said sleeve and cooperatively engaging the member to be clamped; power means for rotating said cam member through a limited arc to effect clamping action; means for shifting the sleeve on said bolt to vary the effectiveness of said power actuating means, including a lock nut having a threaded engagement with said draw bolt and adapted to be positively locked to said sleeve in any one of a plurality of different angular positions; and means for adjusting said clamp nut angularly to effect clamping action independently of said power means.

4. The combination set forth in claim 3 characterized by a single means for limiting the angular movement of said clamp nut and for varying the frictional resistance between the clamp nut and said sleeve.

In witness whereof, I have hereunto subscribed my name.

VICTOR JULLIEN.